(12) United States Patent
Mashima

(10) Patent No.: US 11,002,897 B2
(45) Date of Patent: May 11, 2021

(54) POLARIZING PLATE AND METHOD FOR MANUFACTURING POLARIZING PLATE

(71) Applicant: ZEON CORPORATION, Tokyo (JP)

(72) Inventor: Hiromu Mashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/462,553

(22) PCT Filed: Nov. 27, 2017

(86) PCT No.: PCT/JP2017/042396
§ 371 (c)(1),
(2) Date: May 21, 2019

(87) PCT Pub. No.: WO2018/101204
PCT Pub. Date: Jun. 7, 2018

(65) Prior Publication Data
US 2019/0346606 A1    Nov. 14, 2019

(30) Foreign Application Priority Data
Nov. 30, 2016  (JP) .............................. JP2016-233266

(51) Int. Cl.
*G02B 5/30* (2006.01)
*G02F 1/1335* (2006.01)
(52) U.S. Cl.
CPC ......... *G02B 5/3016* (2013.01); *G02B 5/3025* (2013.01); *G02F 1/133528* (2013.01);
(Continued)

(58) Field of Classification Search
CPC ......... Y10T 428/1041; Y10T 428/1036; Y10T 428/105; C09K 2323/03; C09K 2323/031;
(Continued)

(56) References Cited

U.S. PATENT DOCUMENTS

2008/0095999 A1\* 4/2008 Yoshihara ............... G02B 1/105
428/220
2008/0286485 A1\* 11/2008 Zollner ...................... C09J 9/00
427/516
(Continued)

FOREIGN PATENT DOCUMENTS

CN     1910247 A    2/2007
CN     104950372 A  9/2015
(Continued)

OTHER PUBLICATIONS

Jun. 4, 2019, International Preliminary Report on Patentability issued in the International Patent Application No. PCT/JP2017/042396.
(Continued)

*Primary Examiner* — Sophie Hon
*Assistant Examiner* — Sow-Fun Hon
(74) *Attorney, Agent, or Firm* — Kenja IP Law PC

(57) ABSTRACT

A polarizing plate including a polarizer, and a protective film layer formed on at least one surface of the polarizer, wherein the protective film layer is formed of a protective resin having a volatile component content of 0.03% by weight or less, and a thickness d of the protective film layer satisfies the formula (1): 0.01 μm≤d≤0.5 μm (1).

9 Claims, 2 Drawing Sheets

(52) U.S. Cl.
CPC ....... *B32B 2329/04* (2013.01); *B32B 2457/20* (2013.01); *C09K 2323/03* (2020.08); *C09K 2323/031* (2020.08); *C09K 2323/035* (2020.08); *G02B 5/3008* (2013.01)

(58) Field of Classification Search
CPC .......... C09K 2323/035; B32B 2329/04; B32B 2457/20; G02B 5/30; G02B 1/14; G02B 5/3025; G02B 5/3033; G02F 1/133528
See application file for complete search history.

(56) References Cited

U.S. PATENT DOCUMENTS

| | | | |
|---|---|---|---|
| 2012/0015169 A1* | 1/2012 | Ohta | G02B 1/04 428/216 |
| 2014/0338733 A1* | 11/2014 | Takegami | H01L 31/049 136/251 |
| 2015/0277005 A1* | 10/2015 | Kim | G02B 5/3033 359/492.01 |
| 2015/0349296 A1 | 12/2015 | Mashima et al. | |
| 2016/0363699 A1 | 12/2016 | Kunai | |
| 2017/0235023 A1 | 8/2017 | Mita et al. | |
| 2017/0235024 A1 | 8/2017 | Xu et al. | |
| 2017/0299779 A1 | 10/2017 | Mita et al. | |
| 2017/0299790 A1 | 10/2017 | Ueno et al. | |
| 2017/0299919 A1 | 10/2017 | Miyai et al. | |
| 2017/0299920 A1 | 10/2017 | Mita et al. | |

FOREIGN PATENT DOCUMENTS

| | | | |
|---|---|---|---|
| JP | 2010224512 | A | 10/2010 |
| JP | 2010277063 | A | 12/2010 |
| JP | 2011128486 | A | 6/2011 |
| JP | 2014029563 | A * | 2/2014 |
| JP | 2014209439 | A | 11/2014 |
| JP | 2015161782 | A | 9/2015 |
| JP | 2015212842 | A | 11/2015 |
| JP | 2016122025 | A | 7/2016 |
| TW | 200420979 | A | 10/2004 |
| TW | 201537242 | A | 10/2015 |
| TW | 201629546 | A | 8/2016 |
| WO | 2016052538 | A1 | 4/2016 |
| WO | 2016072324 | A1 | 5/2016 |

OTHER PUBLICATIONS

Feb. 27, 2018, International Search Report issued in the International Patent Application No. PCT/JP2017/042396.

* cited by examiner

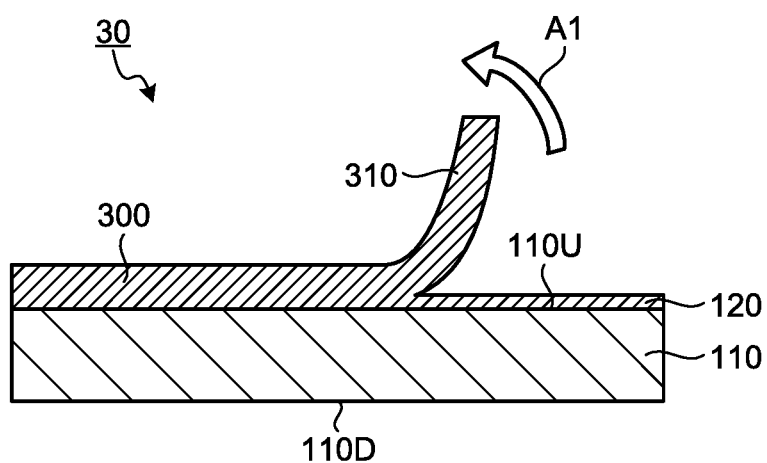

POLARIZING PLATE AND METHOD FOR MANUFACTURING POLARIZING PLATE

FIELD

The present invention relates to a polarizing plate and a method for producing a polarizing plate.

BACKGROUND

In prior-art, there has been known a method for producing a thin polarizer in which a solution containing a polyvinyl alcohol-based resin is applied onto a coating-subject substrate to form a layer of the polyvinyl alcohol-based resin, and then the layer of the polyvinyl alcohol-based resin is subjected to a specific treatment (Patent Literature 1). In this method, the coating-subject substrate is usually peeled off after the polarizer is obtained. However, there are some cases where the surface of the polarizer having been in contact with the coating-subject substrate (this surface may be referred to hereinafter as "peeling surface") gets rough upon peeling of the coating-subject substrate. Such a polarizer having a rough surface has a tendency to have an impaired durability and to crack when heat shock is given. In order to cope with such a reduction in the durability of a polarizer caused by surface roughening, Patent Literature 2 has proposed that a protective layer is formed on the peeling surface of a polarizer. Further, polarizer-related techniques disclosed in Patent Literatures 3 and 4 have also been known.

CITATION LIST

Patent Literature

Patent Literature 1: Japanese Patent Application Laid-Open No. 2011-128486 A
Patent Literature 2: Japanese Patent Application Laid-Open No. 2015-161782 A
Patent Literature 3: Japanese Patent Application Laid-Open No. 2016-122025 A
Patent Literature 4: International Publication No. 2016/052538

SUMMARY

Technical Problem

However, the prior-art protective layers are thick, and therefore the resulting polarizing plates tend to be thick.

The present invention was made in consideration of the above-described problem, and it is an object of the present invention to provide a polarizing plate that can have a reduced thickness while having excellent heat shock resistance and a method for producing such a polarizing plate.

Solution to Problem

The present inventor has intensively studied to solve the above-described problems, and as a result, has found that a thin polarizing plate having excellent heat shock resistance can be achieved by providing a protective film layer on a polarizer through the use of delamination of a resin film. This finding has led to the completion of the present invention.

That is, the present invention provides the following.

<1> A polarizing plate comprising a polarizer, and a protective film layer formed on at least one surface of the polarizer, wherein
the protective film layer is formed of a protective resin having a volatile component content of 0.03% by weight or less, and
a thickness d of the protective film layer satisfies the formula (1):

$$0.01\ \mu m \leq d \leq 0.5\ \mu m \quad (1).$$

<2> A polarizing plate comprising a polarizer, a first protective film layer formed on a first surface of the polarizer, and a second protective film layer formed on a second surface of the polarizer, wherein
the first protective film layer and the second protective film layer are formed of a protective resin having a volatile component content of 0.03% by weight or less, and
a thickness $d_1$ of the first protective film layer and a thickness $d_2$ of the second protective film layer satisfy the formula (2):

$$0.02\ \mu m \leq d_1 + d_2 \leq 1.0\ \mu m \quad (2).$$

<3> The polarizing plate according to <1> or <2>, wherein a thickness of the polarizer is 15 μm or less.
<4> The polarizing plate according to any one of <1> to <3>, wherein the protective resin contains an oriented polymer.
<5> The polarizing plate according to any one of <1> to <4>, comprising an adhesive layer formed of a tackiness agent or a hot-melt material as an outermost layer of the polarizing plate.
<6> The polarizing plate according to any one of <1> to <5>, wherein the polarizer is formed of a polyvinyl alcohol-based resin.
<7> The polarizing plate according to any one of <1> to <6>, wherein the protective resin is at least one resin selected from the group consisting of a cyclic olefin resin; a polymer resin having a hydrogenated product unit of a cyclic hydrocarbon group-containing compound and a hydrogenated product unit of a chain hydrocarbon compound; and an acrylic resin.
<8> A method for producing a polarizing plate comprising:
a step (A) of subjecting a resin film to a stretching treatment, the treatment including stretching at a stretching ratio of 1.1 times or more;
a step (B) of bonding the resin film having been subjected to the stretching treatment in the step (A) and a polarizer together to obtain an intermediate layered body; and
a step (C) of peeling off a part of the resin film of the intermediate layered body to provide, on the polarizer, a protective film layer formed of a surface layer part of the resin film that has not been peeled off and having a thickness of 0.5 μm or less.
<9> The method for producing a polarizing plate according to <8>, wherein the resin film includes at least one resin selected from the group consisting of a cyclic olefin resin; a polymer resin having a hydrogenated product unit of a cyclic hydrocarbon group-containing compound and a hydrogenated product unit of a chain hydrocarbon compound; and an acrylic resin.

Advantageous Effects of Invention

According to the present invention, it is possible to provide a polarizing plate that can have a reduced thickness while having excellent heat shock resistance and a method for producing such a polarizing plate.

BRIEF DESCRIPTION OF DRAWINGS

FIG. 3 is a cross-sectional view schematically showing an intermediate layered body in a step (C) of a production method as a third embodiment of the present invention.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the film is not particularly limited, but may be 100,000 times or less the width thereof, for example.

In the following description, an in-plane retardation Re of a layer is a value represented by Re=(nx−ny)×d unless otherwise specified. Herein, nx represents a refractive index in a direction which gives the maximum refractive index among directions perpendicular to the thickness direction of the layer (in-plane directions), ny represents a refractive index in a direction, among the above-mentioned in-plane directions of the layer, orthogonal to the direction giving nx, and d represents the thickness of the layer. The measurement wavelength of the in-plane retardation is 590 nm unless otherwise specified.

In the following description, unless otherwise specified, a cyclic hydrocarbon group means a hydrocarbon group containing a cyclic structure such as an aromatic ring, cycloalkane, cycloalkene and the like, and a chain hydrocarbon compound means a hydrocarbon compound that does not include such cyclic hydrocarbon groups.

In the following description, a "polarizing plate" includes not only a rigid member but also a flexible member such as a resin film, unless otherwise specified.

In the following description, the term "(meth) acrylic acid" encompasses acrylic acid, methacrylic acid and a combination thereof.

First Embodiment

Figure 1:
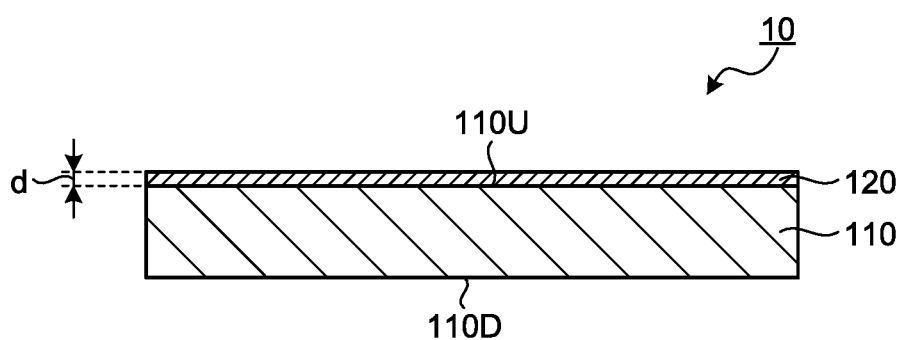
FIG. 1 is a cross-sectional view schematically showing a polarizing plate as a first embodiment of the present invention.

FIG. 1 is a cross-sectional view schematically showing a polarizing plate 10 as a first embodiment of the present invention. As shown in FIG. 1, the polarizing plate 10 as the first embodiment of the present invention includes a polarizer 110 and at least one protective film layer 120.

(Polarizer)

The polarizer 110 may be a film that is capable of allowing passing therethrough of one of two linearly polarized light beams intersecting at a right angle and is also capable of absorbing or reflecting the other. Such a polarizer 110 is, for example, a resin film that has been subjected to appropriate treatments such as a dyeing treatment, a stretching treatment, and a cross-linking treatment in an appropriate order by appropriate methods. Specific examples of the polarizer 110 may include polarizers described in Patent Literatures 1 to 4. Of these, a polarizer formed of a polyvinyl alcohol-based resin is preferable.

As the polyvinyl alcohol resin, a resin containing a polyvinyl alcohol-based polymer and, if necessary, an additive may be used. Examples of the polyvinyl alcohol-based polymer may include polyvinyl alcohol and derivatives thereof. Examples of derivatives of polyvinyl alcohol may include polyvinyl formal; polyvinyl acetal; and those obtained by modifying polyvinyl alcohol with an olefin such as ethylene and propylene, an unsaturated carboxylic acid such as acrylic acid, methacrylic acid, and crotonic acid, an alkyl ester of an unsaturated carboxylic acid, acrylamide, and the like.

The thickness of the polarizer 110 is preferably 3 µm or more, more preferably 5 µm or more, and particularly preferably 7 µm or more, and preferably 15 µm or less, preferably 13 µm or less, and particularly preferably 10 µm or less. When the thickness of the polarizer 110 is equal to or more than the lower limit value of the aforementioned range, the polarizing plate 10 having a sufficiently high degree of polarization can be obtained. When the thickness is equal to or less than the upper limit value of the aforementioned range, the resistance to bending of the polarizing plate 10 can be effectively enhanced.

(Protective Film Layer)

The protective film layer 120 is a layer formed on at least one surface 110U of the polarizer 110. By forming the protective film layer 120 on the surface 110U of the polarizer 110 in this manner, the polarizer 110 is protected by the protective film layer 120, which makes it possible to obtain a polarizing plate 10 having excellent durability. As shown in FIG. 1, the protective film layer 120 formed on at least one surface 110U of the polarizer 110 can improve the durability of the polarizing plate 10, but from the viewpoint of further improving durability, the protective film layer 120 is preferably formed on both surfaces 110U and 110D of the polarizer 110.

The thickness d of the protective film layer 120 satisfies the following formula (1).

$$0.01 \ \mu m \leq d \leq 0.5 \ \mu m \tag{1}$$

More specifically, the thickness d of one protective film layer 120 is usually 0.01 µm or more, preferably 0.012 µm or more, and particularly preferably 0.02 µm or more, and is usually 0.5 µm or less, preferably 0.3 µm or less, and particularly preferably 0.1 µm or less. When the protective film layer 120 has such a reduced thickness d, an expansion force generated in the protective film layer 120 when heat shock is given can be made small, which makes it possible to effectively prevent the occurrence of cracking. Further, when the protective film layer 120 is thin, the overall thickness of the polarizing plate 10 can also be reduced. Therefore, a large stress is not usually generated in the polarizing plate 10 even when the polarizing plate 10 is bent, and consequently the polarizing plate 10 can have excellent resistance to bending. Further, when the protective film layer 120 is thin, the in-plane retardation of the protective film layer 120 can usually be made small.

The thickness d of the protective film layer 120 may be measured in the following manner.

The polarizing plate 10 is cut using a microtome, and then the cross section of the polarizing plate 10 is observed with a transmission electron microscope (TEM). The size in thickness direction of the protective film layer 120 is measured at five positions, and the average of measured values is adopted as the thickness d of the protective film layer 120.

As shown in FIG. 1, the protective film layer 120 may be directly formed on the surface 110U of the polarizer 110 without any layer interposed between the protective film layer 120 and the polarizer 110. Alternatively, the protective film layer 120 may be indirectly formed on the surface 110U of the polarizer 110 via an optional layer (not shown) such as an adhesive layer or a tacky layer.

The protective film layer 120 is usually formed of a resin. In the following description, a resin forming the protective film layer 120 may be referred to as "protective resin" for the sake of distinguishing this resin from other resins. In the first embodiment of the present invention, a resin whose volatile component content is usually 0.03% by weight or less, preferably 0.02% by weight or less, particularly preferably 0.01% by weight or less is used as a protective resin. That the protective film layer 120 is formed of such a protective resin having a low volatile component content means that the protective film layer 120 is formed by a method in which volatile components such as solvents and residual monomers are eliminated, and more specifically means that the protective film layer 120 is formed by a method other than a coating method. When the protective film layer 120 is formed of a protective resin having a low volatile component content, the polarizer 110 can be prevented from being degraded by volatile components and therefore can be expected to have a longer lifetime.

Herein, the volatile components are substances having a molecular weight of 200 or less, and examples thereof include residual monomers and solvents. The volatile component content may be measured as a total content of substances having a molecular weight of 200 or less by gas chromatography analysis.

The protective resin usually contains a polymer, and if necessary, may further contain an optional component other than the polymer. In the protective film layer 120, it is preferable that the polymer is oriented. In general, when molecules of a polymer contained in a resin film are oriented, delamination tends to easily occur in the middle of the thickness direction of the resin film. Therefore, when formed by a method as a third embodiment of the present invention that will be described later, the protective film layer 120 can be easily obtained.

As the protective resin, a thermoplastic resin is preferably used. The thermoplastic resin may be molded in a form of a film by a melt extrusion method, which makes it possible to easily obtain a protective film layer 120 having a low volatile component content. Such a protective resin is preferably at least one resin selected from the group consisting of a cyclic olefin resin; a polymer resin having a hydrogenated product unit of a cyclic hydrocarbon group-containing compound and a hydrogenated product unit of a chain hydrocarbon compound; and an acrylic resin. Of these, use of a cyclic olefin resin or a polymer resin having a hydrogenated product unit of a cyclic hydrocarbon group-containing compound and a hydrogenated product unit of a chain hydrocarbon compound can result in production of a protective film layer 120 that is thin and nevertheless has a high water vapor barrier property.

The cyclic olefin resin represents a resin including a polymer containing an alicyclic structure. Hereinafter, a polymer containing an alicyclic structure may be referred to as an "alicyclic structure-containing polymer" as appropriate. Since the alicyclic structure-containing polymer has excellent mechanical strength, the resistance to bending of the polarizing plate 10 can be effectively increased. In addition, since the alicyclic structure-containing polymer has low hygroscopicity, the water vapor transmission rate of the protective film layer 120 can be effectively reduced, so that the heat moisture resistance of the polarizing plate 10 can be enhanced. In addition, the alicyclic structure-containing polymer is usually excellent in transparency, size stability, and light-weight property.

The alicyclic structure-containing polymer is a polymer having an alicyclic structure in the repeating units thereof, and examples thereof may include a polymer which may be obtained by a polymerization reaction using a cyclic olefin as a monomer and a hydrogenated product thereof. As the alicyclic structure-containing polymer, any of a polymer containing an alicyclic structure in a main chain and a polymer containing an alicyclic structure in a side chain may be used. Examples of the alicyclic structure may include a cycloalkane structure and a cycloalkene structure, and a cycloalkane structure is preferable from the viewpoint of thermal stability or the like.

The number of carbon atoms contained in one alicyclic structure is preferably 4 or more, more preferably 5 or more, and further preferably 6 or more, and preferably 30 or less, more preferably 20 or less, and particularly preferably 15 or less. When the number of carbon atoms contained in one alicyclic structure falls within the aforementioned range, mechanical strength, heat resistance, and moldability are highly balanced.

The ratio of the repeating unit having an alicyclic structure in the alicyclic structure-containing polymer is preferably 30% by weight or more, more preferably 50% by weight or more, further preferably 70% by weight or more, and particularly preferably 90% by weight or more. By increasing the ratio of the repeating unit having an alicyclic structure as described above, heat resistance can be enhanced.

In addition, the rest of the alicyclic structure-containing polymer other than the structural unit having an alicyclic structure is not particularly limited, and may be appropriately selected according to the purposes of use.

Specific examples of such alicyclic structure-containing polymers may include (1) a norbornene-based polymer, (2) a monocyclic olefin polymer, (3) a cyclic conjugated diene polymer, (4) a vinyl alicyclic hydrocarbon polymer, and hydrogenated products of these. Of these, a norbornene-based polymer and a hydrogenated product thereof are more preferable from the viewpoints of transparency and moldability.

Examples of the norbornene-based polymer may include a ring-opening polymer of a norbornene monomer, a ring-opening copolymer of a norbornene monomer and another monomer capable of ring-opening copolymerization therewith, and hydrogenated products thereof; an addition polymer of a norbornene monomer, and an addition copolymer of a norbornene monomer and another monomer capable of copolymerization therewith. Of these, a hydrogenated product of a ring-opening polymer of a norbornene monomer is particularly preferable from the viewpoint of transparency.

The alicyclic structure-containing polymers described above are selected from the polymers disclosed, for example, in Japanese Patent Application Laid-Open No. 2002-321302 A.

As the cyclic olefin resin, various products are commercially available, and those having desired properties may be appropriately selected for use. Examples of such commercially available products may include the product groups of the trade names "ZEONOR" (manufactured by ZEON Corporation), "Arton" (manufactured by JSR Corporation), "Apel" (manufactured by Mitsui Chemicals Inc.) and "TOPAS" (manufactured by Polyplastics Corporation).

The polymer resin having a hydrogenated product unit of a cyclic hydrocarbon group-containing compound and a hydrogenated product unit of a chain hydrocarbon compound means a resin containing a polymer having a (a) hydrogenated product unit of a cyclic hydrocarbon group-containing compound and a (b) hydrogenated product unit of a chain hydrocarbon compound. Hereinafter, the polymer having a (a) hydrogenated product unit of a cyclic hydrocarbon group-containing compound and a (b) hydrogenated product unit of a chain hydrocarbon compound may be referred to as "polymer X" as appropriate. Since the polymer X has high flexibility and excellent mechanical strength, the resistance to bending of the polarizing plate 10 can be effectively increased. In addition, since the polymer X has low hygroscopicity, the water vapor transmission rate of the protective film layer 120 can be effectively reduced, so that the heat moisture resistance of the polarizing plate 10 can be enhanced. In addition, since the polymer X usually exhibits a small retardation, in-plane retardation of the protective film layer 120 can particularly be easily made small.

The (a) hydrogenated product unit of a cyclic hydrocarbon group-containing compound is a structural unit having a structure obtained by polymerizing a cyclic hydrocarbon group-containing compound and hydrogenating unsaturated bonds if the unit obtained by such polymerization has unsaturated bonds. However, the (a) hydrogenated product unit of a cyclic hydrocarbon group-containing compound encompasses any unit obtained by any production method as long as it has this structure.

The (a) hydrogenated product unit of a cyclic hydrocarbon group-containing compound is preferably a (a) hydrogenated product unit of an aromatic vinyl compound which has a structure obtained by polymerizing an aromatic vinyl compound and hydrogenating unsaturated bonds thereof. However, the (a) hydrogenated product unit of an aromatic vinyl compound encompasses any unit obtained by any production method as long as it has this structure.

In the same manner as the above, in the present application, a structural unit having a structure obtained by, for example, polymerizing styrene and hydrogenating its unsaturated bonds may be referred to as a styrene hydrogenated product unit. The styrene hydrogenated product unit encompasses any unit obtained by any production method as long as the unit has this structure.

Examples of the (a) hydrogenated product unit of an aromatic vinyl compound may include a structural unit represented by the following structural formula (a1).

(a1)

In the structural formula (a1), $R^c$ represents an alicyclic hydrocarbon group. Examples of $R^c$ may include cyclohexyl groups such as a cyclohexyl group; and decahydronaphthyl groups.

In the structural formula (a1), $R^1$, $R^2$, and $R^3$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Of these, $R^1$, $R^2$, and $R^3$ are preferably a hydrogen atom and a chain hydrocarbon group of 1 to 6 carbon atoms from the viewpoints of heat resistance, low birefringence, mechanical strength, and the like. As the chain hydrocarbon group, a saturated hydrocarbon group is preferable, and an alkyl group is more preferable.

Preferable specific examples of the (a) hydrogenated product unit of an aromatic vinyl compound may include a structural unit represented by the following formula (a1-1). The structural unit represented by the formula (a1-1) is a styrene hydrogenated product unit.

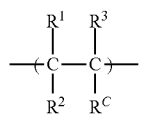

(a1-1)

As to those having stereospecificity among the examples of the (a) hydrogenated product unit of a cyclic hydrocarbon group-containing compound, any stereoisomer thereof may be used. As the aforementioned (a) hydrogenated product unit of a cyclic hydrocarbon group-containing compound, one type thereof may be solely used, and two or more types thereof may also be used in combination at any ratio.

The (b) hydrogenated product unit of a chain hydrocarbon compound is a structural unit having a structure obtained by polymerizing a chain hydrocarbon compound and hydrogenating unsaturated bonds if the unit obtained by such polymerization has unsaturated bonds. However, the (b) hydrogenated product unit of a chain hydrocarbon compound encompasses any unit obtained by any production method as long as it has this structure.

The (b) hydrogenated product unit of a chain hydrocarbon compound is preferably a (b) hydrogenated product unit of a diene compound which has a structure obtained by polymerizing a diene compound and hydrogenating unsaturated bonds if the obtained polymer has unsaturated bonds. However, the (b) hydrogenated product unit of a diene compound encompasses any unit obtained by any production method as long as it has this structure.

In the same manner as the above, in the present application, a structural unit having a structure obtained by, for example, polymerizing isoprene and hydrogenating its unsaturated bonds may be referred to as an isoprene hydrogenated product unit. The isoprene hydrogenated product unit encompasses any unit obtained by any production method as long as the unit has this structure.

The (b) hydrogenated product unit of a diene compound preferably has a structure obtained by polymerizing a conjugated diene compound such as a straight chain conjugated diene compound and hydrogenating the unsaturated bonds. Examples thereof may include a structural unit represented by the following structural formula (b1) and a structural unit represented by the structural formula (b2).

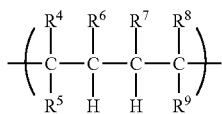

(b1)

In the structural formula (b1), $R^4$ to $R^9$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Of these, $R^4$ to $R^9$ are preferably a hydrogen atom or a chain hydrocarbon group of 1 to 6 carbon atoms from the viewpoints of heat resistance, low birefringence, mechanical strength, and the like. As the chain hydrocarbon group, a saturated hydrocarbon group is preferable, and an alkyl group is more preferable.

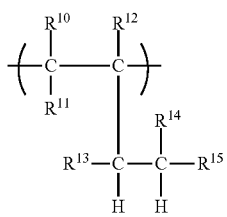

(b2)

In the structural formula (b2), $R^{10}$ to $R^{15}$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Of these, $R^{10}$ to $R^{15}$ are preferably a hydrogen atom or a chain hydrocarbon group of 1 to 6 carbon atoms from the viewpoints of heat resistance, low birefringence, mechanical strength, and the like. As the chain hydrocarbon group, a saturated hydrocarbon group is preferable, and an alkyl group is more preferable.

Preferable specific examples of the (b) diene compound hydrogenated product unit may include structural units represented by the following formulas (b1-1) to (b1-3). The structural units represented by the formulas (b1-1) to (b1-3) are the isoprene hydrogenated product units.

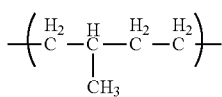

(b1-1)

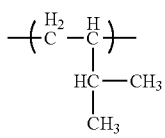

(b1-2)

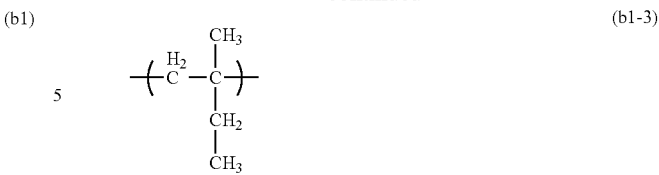

(b1-3)

As to those having sterepspecificity among the examples of the (b) hydrogenated product unit of a chain hydrocarbon compound, any stereoisomer thereof may be used. As the aforementioned (b) hydrogenated product unit of a chain hydrocarbon compound, one type thereof may be solely used, and two or more types thereof may also be used in combination at any ratio.

From the viewpoint of keeping the properties of the protective film layer 120 within preferable ranges, the polymer X is preferably a block copolymer. Therefore, it is preferable that the polymer X has a block A containing the (a) hydrogenated product unit of a cyclic hydrocarbon group-containing compound or a block B containing the (b) hydrogenated product unit of a chain hydrocarbon compound. In particular, the polymer X preferably has a block A containing the (a) hydrogenated product unit of a cyclic hydrocarbon group-containing compound and a block B containing the (b) hydrogenated product unit of a chain hydrocarbon compound.

The block A is preferably formed only of the (a) hydrogenated product unit of a cyclic hydrocarbon group-containing compound, but may contain any units other than the (a) hydrogenated product unit of a cyclic hydrocarbon group-containing compound. Examples of the optional structural units may include structural units based on a vinyl compound other than the (a) hydrogenated product unit of a cyclic hydrocarbon group-containing compound. The content of the (a) hydrogenated product unit of a cyclic hydrocarbon group-containing compound in the block A is preferably 90% by weight or more, more preferably 95 by weight or more, and particularly preferably 99 by weight or more. By increasing the content of the (a) hydrogenated product unit of a cyclic hydrocarbon group-containing compound in the block A as described above, hardness and heat resistance of the protective film layer 120 can be increased.

The block B may be formed only of the (b) hydrogenated product unit of a chain hydrocarbon compound, but preferably contains the (a) hydrogenated product unit of a cyclic hydrocarbon group-containing compound in combination with the (b) hydrogenated product unit of a chain hydrocarbon compound. The content of the (b) hydrogenated product unit of a chain hydrocarbon compound in the block B is preferably 30% by weight or more, more preferably 35% by weight or more, and particularly preferably 40% by weight or more, and is preferably 70% by weight or less, and more preferably 65% by weight or less. The content of the (a) hydrogenated product unit of a cyclic hydrocarbon group-containing compound in the block B is preferably 30% by weight or more, more preferably 35% by weight or more, and particularly preferably 40% by weight or more, and is preferably 70% by weight or less, and more preferably 65% by weight or less. With such content ratios, hardness and heat resistance of the protective film layer 120 can be increased. The block B may also contain optional units other than the (a) hydrogenated product unit of a cyclic hydrocarbon group-containing compound and the (b) hydrogenated product unit of a chain hydrocarbon compound.

Examples of the optional structural units may include structural units based on a vinyl compound other than the (a) hydrogenated product unit of a cyclic hydrocarbon group-containing compound and the (b) hydrogenated product unit of a chain hydrocarbon compound.

The number and arrangement of the blocks A and B in the polymer X is freely determined. However, it is preferable that the polymer X has a triblock molecular structure having one block B per molecule and two blocks A per molecule connected to both ends of the block B. That is, the polymer X is preferably a triblock copolymer containing one block B per molecule; one block A1 per molecule connected to one end of the block B; and one block A2 per molecule connected to the other end of the block B. In this instance, the block A1 and the block A2 may be the same as or different from each other.

In the polymer X, it is preferable that the weight ratio (A/B) of the block A relative to the block B falls within a specific range. Specifically, the weight ratio (A/B) is preferably 20/80 or more, more preferably 25/75 or more, and particularly preferably 30/70 or more, and is preferably 80/20 or less, more preferably 75/25 or less, and particularly preferably 70/30 or less. The polymer X having the weight ratio (A/B) of the blocks A and B in the aforementioned range has a small photoelastic coefficient and a small retardation expression. Therefore, the protective film layer 120 having a small in-plane retardation can be easily obtained.

The method for producing the polymer X is not particularly limited, and any method for producing the polymer X may be adopted. The polymer X may be produced by, for example, preparing monomers corresponding to the (a) hydrogenated product unit of a cyclic hydrocarbon group-containing compound and the (b) hydrogenated product unit of a chain hydrocarbon compound, polymerizing them, and hydrogenating the obtained polymer.

As the monomer corresponding to the (a) hydrogenated product unit of a cyclic hydrocarbon group-containing compound, an aromatic vinyl compound may be used. Examples thereof may include styrenes such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, and 4-phenylstyrene; vinylcyclohexanes such as vinylcyclohexane and 3-methylisopropenylcyclohexane; and vinylcyclohexenes such as 4-vinylcyclohexene, 4-isopropenylcyclohexene, 1-methyl-4-vinylcyclohexene, 1-methyl-4-isopropenylcyclohexene, 2-methyl-4-vinylcyclohexene, and 2-methyl-4-isopropenylcyclohexene. As these monomers, one type thereof may be solely used, and two or more types thereof may also be used in combination at any ratio.

Examples of the monomers corresponding to the (b) hydrogenated product unit of a chain hydrocarbon compound may include chain conjugated dienes such as butadiene, isoprene, 2,3-dimethyl-1,3-butadiene, 1,3-pentadiene, and 1,3-hexadiene. As these monomers, one type thereof may be solely used, and two or more types thereof may also be used in combination at any ratio.

As the reaction mode of polymerization, anionic polymerization may be usually employed. The polymerization may be performed by any of bulk polymerization, solution polymerization, and the like. Of these, solution polymerization is preferable in order to perform the polymerization reaction and the hydrogenation reaction in a continuous manner.

Examples of the reaction solvent for polymerization may include aliphatic hydrocarbon solvents such as n-butane, n-pentane, isopentane, n-hexane, n-heptane, and isooctane; alicyclic hydrocarbon solvents such as cyclopentane, cyclohexane, methylcyclopentane, methylcyclohexane, and decalin; and aromatic hydrocarbon solvents such as benzene and toluene. Of these, the use of an aliphatic hydrocarbon solvent and an alicyclic hydrocarbon solvent is preferable because they can also be used as an inert solvent in the hydrogenation reaction as they are.

As the reaction solvent, one type thereof may be solely used, and two or more types thereof may also be used in combination at any ratio.

The reaction solvent is usually used in a ratio of 200 to 10,000 parts by weight with respect to 100 parts by weight of the total monomer.

In the polymerization, a polymerization initiator is usually used. Examples of the polymerization initiators may include mono-organolithium such as n-butyllithium, sec-butyllithium, t-butyllithium, hexyllithium, and phenyllithium; and polyfunctional organolithium compounds such as dilithiomethane, 1,4-dilithiobutane, and 1,4-dilithio-2-ethylcyclohexane. As the polymerization initiators, one type thereof may be solely used, and two or more types thereof may also be used in combination at any ratio.

As an example of the production method in the case of producing the triblock copolymer including the block A1, the block A2, and the block B as the polymer X, a production method including the following first to third steps may be mentioned. A material referred to as a "monomer composition" herein includes not only a mixture of two or more substances, but also a material consisting of a single substance.

First step: polymerizing a monomer composition (a1) containing an aromatic vinyl compound to form a block A.

Second step: polymerizing a monomer composition (b) containing a diene compound at one end of the block A to form a block B, thereby forming a polymer of a diblock A-B.

Third step: polymerizing a monomer composition (a2) containing an aromatic vinyl compound at an end of the polymer of the diblock on the side of the block B to obtain a triblock copolymer. The monomer composition (a1) and the monomer composition (a2) may be the same as or different from each other.

Upon polymerizing each block, a polymerization promoter and a randomizer may be used for preventing the chain of one component from being excessively lengthened within each block. For example, when the polymerization is performed by anionic polymerization, a Lewis base compound may be used as a randomizer. Specific examples of the Lewis base compounds may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethyl ethylenediamine, trimethylamine, triethylamine, and pyridine; an alkali metal alkoxide compound such as potassium-t-amyl oxide, and potassium-t-butyl oxide; and a phosphine compound such as triphenylphosphine. As the Lewis base compound, one type thereof may be solely used, and two or more types thereof may also be used in combination at any ratio.

The polymerization temperature is not limited as long as the polymerization proceeds, but is usually 0° C. or higher, and preferably 20° C. or higher, and usually 200° C. or lower, preferably 100° C. or lower, and more preferably 80° C. or lower.

After polymerization, the polymer may be recovered from the reaction mixture by any optional method, if necessary. Examples of recovery methods may include a steam stripping method, a direct desolvation method, and an alcohol coagulation method. When a solvent inert to the hydrogenation reaction is used during polymerization as the reaction solvent, the polymer may be directly subjected to the hydrogenation step without being recovered from the polymerization solution.

There is no limitation on the hydrogenation method of the polymer, and any method may be adopted. The hydrogenation may be performed, for example, using a suitable hydrogenation catalyst. More specifically, hydrogenation may be performed using a hydrogenation catalyst containing at least one metal selected from the group consisting of nickel, cobalt, iron, rhodium, palladium, platinum, ruthenium, and rhenium in an organic solvent. The hydrogenation catalyst may be a heterogeneous catalyst or a homogeneous catalyst. As the hydrogenation catalyst, one type thereof may be solely used, and two or more types thereof may also be used in combination at any ratio.

The heterogeneous catalyst may be used as a metal or metal compound as they are, and may also be used in a state of being supported on a suitable carrier. Examples of the carrier may include activated carbon, silica, alumina, calcium carbide, titania, magnesia, zirconia, diatomaceous earth, and silicon carbide. The amount of the catalyst supported on the carrier is usually 0.01% by weight or more, and preferably 0.05% by weight or more, and is usually 80% by weight or less, and preferably 60% by weight or less.

Examples of the homogeneous catalysts may include a catalyst that is a combination of compounds of nickel, cobalt, or iron with an organometallic compound; and organometallic complex catalysts of such as rhodium, palladium, platinum, ruthenium, and rhenium. Examples of the nickel, cobalt, or iron compounds may include acetylacetone salts, naphthenates, a cyclopentadienyl compound, and a cyclopentadienyl dichloro compound of these metals. Examples of the organometallic compound may include an organoaluminum compound and an organolithium compound. Examples of the organoaluminum compounds may include an alkylaluminum such as triethylaluminum and triisobutylaluminum; an aluminum halide such as diethylaluminum chloride and ethylaluminum dichloride; and an alkylaluminum hydrogenated product such as diisobutylaluminum hydride.

Examples of the organometallic complex catalyst may include metal complexes such as a δ-dichloro-π-benzene complex, a dichloro-tris(triphenylphosphine) complex, and a hydride-chloro-triphenylphosphine) complex of each of the above-described metals.

The amount of the hydrogenation catalyst used is usually 0.01 part by weight or more, preferably 0.05 part by weight or more, and more preferably 0.1 part by weight or more, and is usually 100 parts by weight or less, preferably 50 parts by weight or less, and more preferably 30 parts by weight or less, relative to 100 parts by weight of the polymer.

The reaction temperature in the hydrogenation reaction is usually 10° C. to 250° C., but is preferably 50° C. or higher, and more preferably 80° C. or higher, and is preferably 200° C. or lower, and more preferably 180° C. lower, because the hydrogenation rate can be increased and the polymer chain scission reaction can be reduced. The pressure during the reaction is usually 0.1 MPa to 30 MPa, but from the viewpoint of operability in addition to the above-described reasons, the pressure during the reaction is preferably 1 MPa or more, and more preferably 2 MPa or more, and is preferably 20 MPa or less, and more preferably 10 MPa or less.

The hydrogenation rate is usually 90% or more, preferably 95% or more, and more preferably 97% or more. By increasing the hydrogenation rate, low birefringence, thermal stability, and the like of the polymer X can be improved. The hydrogenation rate may be measured by $^1$H-NMR.

The acrylic resin is a resin containing an acrylic polymer. The acrylic polymer means a polymer of acrylic acid or an acrylic acid derivative, and examples thereof may include polymers of acrylic acid, acrylic acid ester, acrylamide, acrylonitrile, methacrylic acid, and methacrylic acid ester and copolymers thereof. Since the acrylic polymer has high mechanical strength and is hard, the mechanical strength of the polarizing plate 10 can be effectively increased. As such an acrylic polymer, those described in Japanese Patent Application Laid-Open No. 2015-212842 A may be adopted.

The weight-average molecular weight Mw of the polymer contained in the protective resin is preferably 5000 or more, more preferably 8000 or more, and particularly preferably 10000 or more, and is preferably 500000 or less, more preferably 200000 or less, and particularly preferably 100000 or less. When the weight-average molecular weight Mw falls within the aforementioned range, a desired protective film layer 120 can be easily obtained.

The molecular weight distribution (weight-average molecular weight (Mw)/number-average molecular weight (Mn)) of the polymer contained in the protective resin is preferably 2.0 or less, more preferably 1.7 or less, and particularly preferably 1.5 or less, and is preferably 1.0 or more. When the molecular weight distribution falls within the aforementioned range, polymer viscosity can be lowered to enhance the moldability.

The weight-average molecular weight is a polyisoprene or polystyrene-equivalent weight-average molecular weight measured by gel permeation chromatography using cyclohexane as a solvent. However, when the sample is not dissolved in cyclohexane, toluene may be used as the solvent.

The protective resin may contain one type of the polymers solely, and may also contain two or more types thereof in combination at any ratio.

The ratio of the polymer in the protective resin is preferably 90% by weight or more, more preferably 95% by weight or more, and particularly preferably 97% by weight or more from the viewpoint of facilitating the obtention of the desired protective film layer 120.

The protective resin may contain any optional component other than the polymer in combination with the polymer described above. Examples of the optional components may include inorganic particulates; a stabilizer such as an antioxidant, a thermal stabilizer, an ultraviolet absorber, and a near infrared absorber; a resin modifier such as a lubricant and a plasticizer; a colorant such as a dye and a pigment; and an antistatic agent. As the optional components, one type thereof may be solely used, and two or more types thereof may also be used in combination at any ratio. From the viewpoint of remarkably exhibiting the effects of the present invention, it is preferable that the content ratio of the optional component is small. For example, the total ratio of the optional components is preferably 10 parts by weight or less, more preferably 5 parts by weight or less, and further preferably 3 parts by weight or less, relative to 100 parts by weight of the polymers contained in the protective resin.

The glass transition temperature of the protective resin is preferably 75° C. or higher, more preferably 80° C. or higher, and particularly preferably 85° C. or higher, and is preferably 130° C. or lower, more preferably 125° C. or lower, and particularly preferably 120° C. or lower. When the glass transition temperature of the protective resin is equal to or higher than the lower limit value of the aforementioned range, heat resistance of the polarizing plate 10 can be enhanced. When the glass transition temperature is equal to or lower than the upper limit value of the aforementioned range, the resin film can be easily stretched in the production method of the protective film layer 120.

The in-plane retardation of the protective film layer 120 is preferably small. Specifically, the in-plane retardation of the protective film layer 120 is preferably 3 nm or less, more preferably 2 nm or less, and particularly preferably 1 nm or less. By having such a small in-plane retardation of the protective film layer 120, in the case of providing the polarizing plate 10 in an image display device, the optical design thereof can be facilitated.

The in-plane retardation of the protective film layer 120 may be measured using a phase difference meter ("Mura Matrix Polarimeter (Axo Scan)" manufactured by Opto Science Inc.).

In general, most part of the thickness of a prior-art polarizing plate is occupied by the protective layer. On the other hand, the polarizing plate 10 according to this embodiment has a thin protective film layer 120, and therefore can be made thin. Specific thickness of the polarizing plate 10 is preferably 3 µm or more, more preferably 5 µm or more, and particularly preferably 7 µm or more, and is preferably 35 µm or less, more preferably 30 µm or less, and particularly preferably 25 µm or less.

The thickness of the polarizing plate 10 may be measured in the following manner.

The polarizing plate 10 is cut using a microtome, and then the cross section thereof is observed with a TEM. The size in thickness direction of the polarizing plate 10 is measured at 5 points, and the average of measured values is employed as the thickness of the polarizing plate 10.

The polarizing plate 10 thus obtained has excellent durability because the polarizer 110 is protected by the protective film layer 120. Therefore, even when heat shock is given to the polarizing plate 10, the occurrence of cracking can be suppressed.

Further, the polarizing plate 10 itself can be made thin because the protective film layer 120 is thin. Therefore, even when the polarizing plate 10 is bent, a large stress is usually less likely to be generated, and therefore occurrence of cracking can be prevented.

Further, with the use of an appropriate protective resin, the protective film layer 120 can exhibit an excellent water vapor barrier property, and thereby the polarization degree of the polarizing plate 10 can usually be prevented from being reduced in a high humidity environment.

The above-described polarizing plate 10 may be produced by, for example, a production method that will be described later as a third embodiment of the present invention.

The polarizing plate 10 according to the first embodiment of the present invention has been described above in detail, but the polarizing plate 10 may be further modified for implementation.

For example, the polarizing plate 10 may further have an optional layer in combination with the polarizer 110 and the protective film layer 120. Examples of the optional layer may include an adhesive layer (not shown) provided between the polarizer 110 and the protective film layer 120. Hereinafter, the adhesive layer provided between the polarizer 110 and the protective film layer 120 may be referred to as an "internal adhesive layer". Such an internal adhesive layer can tightly bond the polarizer 110 and the protective film layer 120 together.

Examples of the optional layer may also include an adhesive layer (not shown) provided as an outermost layer of the polarizing plate 10. Hereinafter, the adhesive layer provided as an outermost layer of the polarizing plate 10 may be referred to as an "external adhesive layer". Such an external adhesive layer may be provided as an outermost layer on one surface of the polarizing plate 10, and may also be provided as outermost layers on both surfaces of the polarizing plate 10. By providing the external adhesive layer, the polarizing plate 10 can be easily bonded to another member, and assembly of an image display device using the polarizing plate 10 can thereby be facilitated.

The external adhesive layer is preferably formed using a tackiness agent or a hot-melt material. Herein, the tackiness agent is a material that has a shear storage elastic modulus at 23° C. of less than 1 MPa and that exhibits tackiness at ordinary temperature. The hot-melt material means a material that has a shear storage elastic modulus at 23° C. of 1 MPa to 500 MPa and that does not exhibit tackiness at ordinary temperature. Examples of such a tackiness agent and a hot-melt material may include tacky materials described in Japanese Patent Application Laid-Open No. 2014-209439 A.

When the polarizing plate 10 has the protective film layer 120 provided on only the one surface 110U of the polarizer 110, an optional protective layer other than the protective film layer 120 may be provided on the other surface 110D of the polarizer 110. Even in this case, the polarizing plate 10 can be made thinner than prior-art polarizing plates because the protective film layer 120 is used. Therefore, the polarizing plate 10 usually can have improved resistance to bending.

Second Embodiment

Figure 2:
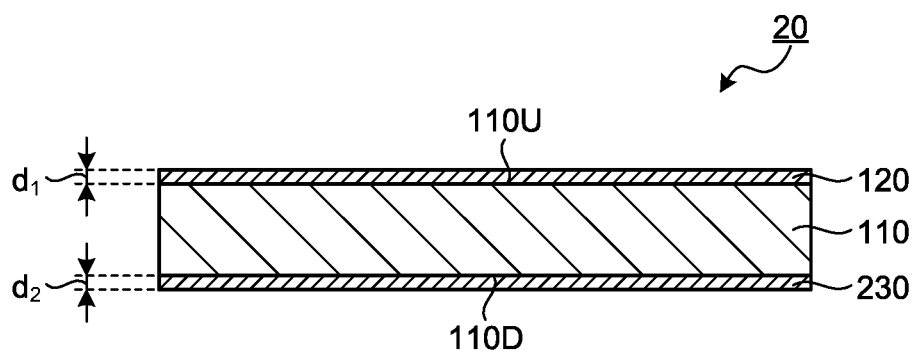
FIG. 2 is a cross-sectional view schematically showing a polarizing plate as a second embodiment of the present invention.

FIG. 2 is a cross-sectional view schematically showing a polarizing plate 20 as a second embodiment of the present invention. As shown in FIG. 2, the polarizing plate 20 as the second embodiment of the present invention is the same as the polarizing plate 10 as the first embodiment except that a protective film layer 230 is provided on the surface 110D of the polarizer 110 in addition to the protective film layer 120 provided on the surface 110U so that the thickness of the protective film layers 120 and 230 satisfies the following formula (2).

Specifically, the polarizing plate 20 includes a polarizer 110, a first protective film layer 120 formed on a surface 110U as the first surface of the polarizer 110, and a second protective film layer 230 formed on a surface 110D as the second surface of the polarizer 110. The polarizer 110 is protected by the first protective film layer 120 and the second protective film 230, and thereby the polarizing plate 20 can have excellent durability.

The thickness $d_1$ of the first protective film layer 120, and the thickness $d_2$ of the second protective film layer 230 satisfy the formula (2).

$$0.02 \text{ µm} \leq d_1 + d_2 \leq 1.0 \text{ µm} \tag{2}$$

More specifically, the total thickness $d_1 + d_2$ is usually 0.02 µm or more, preferably 0.03 µm or more, and particularly preferably 0.04 µm or more, and is usually 1.0 µm or less, preferably 0.3 µm or less, and particularly preferably 0.1 µm or less. When the first protective film layer 120 and the second protective film layer 230 have such a reduced total thickness $d_1+d_2$, the polarizing plate 20 can have the same advantages as the polarizing plate 10 as the first embodiment. In this case, unlike the first embodiment, each of the thickness $d_1$ of the first protective film layer 120 and the thickness $d_2$ of the second protective film layer 230 does not need to satisfy the formula (1). However, from the viewpoint of remarkably obtaining desired effects of the present invention, each of the thickness $d_1$ of the first protective film layer 120 and the thickness $d_2$ of the second protective film layer 230 preferably satisfies the formula (1).

Except for the above-described matters, the polarizing plate 20 as the second embodiment may be the same as the polarizing plate 10 as the first embodiment. Therefore, as the polarizer 110 included in the polarizing plate 20, the one that is the same as that used in the first embodiment may be used. The first protective film layer 120 and the second protective film layer 230 included in the polarizing plate 20 may be the same as the protective film layer 120 according to the first embodiment. Therefore, the first protective film layer 120 and the second protective film layer 230 may each independently have the same composition and properties as those in the protective film layer 120 according to the first embodiment. This allows the polarizing plate 20 as the second embodiment to have the same advantages as those in the polarizing plate 10 as the first embodiment.

The above-described polarizing plate 20 may be produced by, for example, a production method that will be described later as a third embodiment of the present invention.

Although the polarizing plate 20 according to the second embodiment of the present invention has been described above in detail, the polarizing plate 20 may be further modified for implementation.

For example, the polarizing plate 20 may be modified for implementation in the same manner as that described with reference to the polarizing plate 10 according to the first embodiment.

Third Embodiment

The method for producing a polarizing plate as a third embodiment of the present invention includes:

a step (A) of subjecting a resin film to a stretching treatment;

a step (B) of bonding the resin film having been subjected to the stretching treatment in the step (A) and a polarizer together to obtain an intermediate layered body; and a step (C) of peeling off a part of the resin film of the intermediate layered body to provide, on the polarizer, a protective film layer formed of a surface layer part of the resin film that has not been peeled off.

The polarizing plates described above as the first and second embodiments can be produced by this production method.

(Step (A): Stretching Treatment of Resin Film)

In the step (A), a resin film is prepared and subjected to a stretching treatment. In the following description, the resin film that has not yet been subjected to a stretching treatment may be referred to as a "pre-stretch film" and the resin film that has already been subjected to stretching treatment may be referred to as an "oriented film".

As the pre-stretch film, a film formed of a protective resin is used. Usually, the pre-stretch film is a single-layer film formed of a protective resin. The thickness of the pre-stretch film is preferably 15 μm or more, more preferably 20 μm or more, and particularly preferably 25 μm or more, and is preferably 200 μm or less, more preferably 150 μm or less, and particularly preferably 100 μm or less. When the thickness of the pre-stretch film is equal to or more than the lower limit value of the aforementioned range, a part of the oriented film can be smoothly peeled off in the step (C). When the thickness of the pre-stretch film is equal to or less than the upper limit value of the aforementioned range, it is possible to reduce the amount of part of the oriented film peeled off that is unused as a protective film layer, thereby reducing the production cost of the polarizing plate.

The method for producing the pre-stretch film is not particularly limited as long as a desired polarizing plate can be obtained. For example, the pre-stretch film may be produced by molding a resin in a form of a film by an appropriate molding method. Among resin molding methods, a melt molding method is preferable from the viewpoint of obtaining a pre-stretch film having a small volatile component content. More specifically, the melt molding method may be classified into, for example, an extrusion molding method, a press molding method, an inflation molding method, an injection molding method, a blow molding method, and a stretch molding method. Of these methods, an extrusion molding method, an inflation molding method, and a press molding method are preferable in order to obtain a pre-stretch film having excellent mechanical strength and surface accuracy. Of these methods, an extrusion molding method is particularly preferred from the viewpoint of its ability to efficiently and easily produce the pre-stretch film.

After the pre-stretch film is prepared, the pre-stretch film is subjected to a stretching treatment. The stretching treatment includes stretching the pre-stretch film at a specific stretching ratio. When the pre-stretch film is stretched at a specific stretching ratio, molecules of a polymer contained in the pre-stretch film are oriented, and thereby an oriented film is obtained. The oriented molecules of the polymer usually has low degree of entanglement of the molecules. Therefore, such an oriented film containing oriented molecules of the polymer tends to easily cause delamination in the step (C).

The specific stretching ratio is usually 1.1 times or more, preferably 1.2 times or more, and particularly preferably 1.5 times or more, and is preferably 8 times or less, more preferably 7 times or less, and particularly preferably 6 times or less. When the specific stretching ratio is equal to or more than the lower limit value of the aforementioned range, molecules of the polymer contained in the film can be effectively oriented. When the predetermined stretching ratio is equal to or less than the upper limit value of the aforementioned range, occurrence of retardation caused by stretching can be reduced. Usually, the thickness of the protective film layer obtained in the step (C) may be controlled by the stretching ratio.

The stretching treatment may be any one of longitudinal stretching in which stretching is performed in a film lengthwise direction, lateral stretching in which stretching is performed in a film width direction, and oblique stretching in which stretching is performed in an oblique direction that is neither parallel nor perpendicular to a film width direction. The stretching treatment may be either stretching performed in one direction or stretching performed in two or more directions. When stretching is performed in two or more directions, a total stretching ratio expressed as a product of stretching ratios in respective directions is preferably within the above-described range. The stretching treatment is preferably free-end uniaxial stretching, more preferably longitudinal free-end uniaxial stretching.

The stretching temperature during the stretching is preferably set in accordance with the glass transition temperature Tg of the protective resin. Specifically, the stretching temperature is preferably Tg−15° C. or higher, more preferably Tg−10° C. or higher, and particularly preferably Tg−5° C. or higher, and is preferably Tg+20° C. or lower, more preferably Tg+15° C. or lower, and particularly preferably Tg+10° C. or lower. When the stretching temperature is equal to or more than the lower limit value of the aforementioned range, stretching can be smoothly performed. When the stretching temperature is equal to or less than the upper limit value of the aforementioned range, molecules of the polymer can be effectively oriented by stretching.

The stretching treatment performed in the step (A) is a treatment including stretching in at least one direction. The treatment may include stretching performed in only one direction, and may also include stretching performed in two or more directions. When the stretching treatment includes stretching performed in only one direction, stretching is performed in such a manner that a stretching ratio of the stretching falls within the above-described range of the specific stretching ratio. When the stretching treatment includes stretching performed in two or more directions, stretching is performed in such a manner that a total stretching ratio of the stretching falls within the above-described range of the specific stretching ratio. The total stretching ratio refers to a product of stretching ratios in respective directions. When the stretching treatment includes stretching performed in two or more directions, stretching operations may be performed simultaneously or sequentially.

(Step (B): Bonding of Oriented Film and Polarizer)

In the step (B), an oriented film as the resin film having been subjected to a stretching treatment in the step (A) and a polarizer are bonded together to obtain an intermediate layered body including the oriented film and the polarizer. As the polarizer, for example, one described with reference to the first embodiment may be used.

The oriented film may be bonded to only one surface of the polarizer. Alternatively, the oriented films may be bonded to both surfaces of the polarizer. When the oriented film is bonded to only one surface of the polarizer, a polarizing plate may be produced in which a protective film layer is provided on only one surface of the polarizer. When the oriented films are bonded to both surfaces of the polarizer, a polarizing plate may be produced in which protective film layers are provided on both surfaces of the polarizer.

If necessary, an adhesive may be used for bonding the oriented film and the polarizer together. When an adhesive is used, the oriented film and the polarizer are bonded together via an internal adhesive layer, and therefore an intermediate layered body can be obtained which includes the oriented film, the internal adhesive layer, and the polarizer in this order. The adhesive is not particularly limited, and examples thereof may include an acrylic adhesive, a urethane-based adhesive, a polyester-based adhesive, a polyvinyl alcohol-based adhesive, a polyolefin-based adhesive, a modified polyolefin-based adhesive, a polyvinyl alkyl ether-based adhesive, a rubber-based adhesive, a vinyl chloride-vinyl acetate-based adhesive, an SEBS (styrene-ethylene-butylene-styrene copolymer)-based adhesive, an ethylene-based adhesive such as an ethylene-styrene copolymer, and an acrylic acid ester-based adhesive such as an ethylene-methyl (meth)acrylate copolymer or an ethylene-ethyl (meth)acrylate copolymer.

(Step (C): Peeling-Off of a Part of Oriented Film)

FIG. 3 is a cross-sectional view schematically showing an intermediate layered body 30 in the step (C) of the production method as the third embodiment of the present invention.

As shown in FIG. 3, in the step (C), a part 310 of an oriented film 300 of an intermediate layered body 30 obtained in the step (B) is peeled off in such a manner as shown by an arrow A1. Herein, the part 310 of the oriented film 300 to be peeled off refers to a part other than a surface layer part of the oriented film 300 located on the polarizer 110 side.

The oriented film 300 generally tends to easily cause delamination. Therefore, even when an attempt is made to peel off the entirety of the oriented film 300 in its thickness direction from the intermediate layered body 30, only the part 310 of the oriented film 300 is usually peeled off, so that the surface layer part of the oriented film 300 located on the polarizer 110 side remains on the polarizer 110. In the step (C), the surface layer part of the oriented film 300 that has not been peeled off is provided on the polarizer 110 as a protective film layer 120. The surface layer part of the oriented film 300 located on the polarizer 110 side and the protective film layer 120 formed of the surface layer part refer to the same member. Therefore in the following description, the surface layer part of the oriented film 300 is denoted by the same reference sign "120" as the protective film layer 120.

The surface layer part 120 of the oriented film 300 remaining on the polarizer 110 as a result of the above-described peeling is usually thin. Therefore, it is possible to easily produce a polarizing plate having a protective film layer 120 whose thickness satisfies the formula (1) or (2) by the above-described production method.

Further, according to the above-described production method, it is possible to form a protective film layer 120 without using volatile components such as residual monomers and solvents. Therefore, unlike a prior-art protective layer formed by a coating method, the protective film layer 120 formed by the above-described production method can have a low volatile component content.

Further, in the above-described production method, peeling occurs not at the interface between the polarizer 110 and the oriented film 300 but in the inner part the oriented film 300. Therefore, the surface 110U of the polarizer 110 does not get rough, and thereby a reduction in durability caused by roughening of the surface 110U can be prevented.

The peel angle of the part 310 of the oriented film 300 is usually 10° or more, preferably 30° or more, and particularly preferably 45° or more, and is preferably 170° or less, more preferably 150° or less, and particularly preferably 135° or less. When the peel angle is equal to or more than the lower limit value of the aforementioned range, surface state of the protective film layer 120 formed by peeling can be made smooth. When the peel angle is equal to or less than the upper limit value of the aforementioned range, the part 310 of the oriented film 300 can be prevented from being broken when peeled off.

The peel speed of the part 310 of the oriented film 300 is usually 50 mm/min or more, preferably 100 mm/min or more, and particularly preferably 200 mm/min or more, and is preferably 50000 mm/min or less, more preferably 30000 mm/min or less, and particularly preferably 10000 mm/min or less. When the peel speed is equal to or more than the lower limit value of the aforementioned range, the protective film layer 120 can be efficiently formed. When the peel speed is equal to or less than the upper limit value of the aforementioned range, surface state of the protective film layer 120 formed by peeling can be made smooth.

Although FIG. 3 shows how the protective film layer 120 is provided on the one surface 110U of the polarizer 110, the protective film layer 120 may be provided on the both surfaces 110U and 110D of the polarizer 110. Specifically, the protective film layer 120 may be provided on the both surfaces 110U and 110D of the polarizer 110 by bonding the oriented films 300 to the both surfaces 110U and 110D of the polarizer 110 in the step (B) and then peeling off the part 310 of the oriented film 300 bonded to each of the surfaces 110U and 110D in the step (C). Alternatively, the protective film layer 120 may be provided on one surface 110U of the polarizer 110 by performing the steps (A) to (C), and thereafter another protective film layer may be provided on the other surface 110D of the polarizer 110 by further performing the steps (A) to (C).

(Optional Step)

The method for producing a polarizing plate as the third embodiment of the present invention may further include an optional step in addition to the above-described steps (A) to (C).

For example, the above-described method for producing a polarizing plate may include, prior to the step (B), a step wherein the surface of the oriented film to be bonded to the polarizer is subjected to a solvent treatment. The solvent treatment includes applying a solvent onto the surface of the oriented film and then drying the applied solvent. When such a solvent treatment is performed, the protective film layer can usually have a larger thickness than when the solvent treatment is not performed.

As the solvent used for the solvent treatment, a solvent capable of dissolving the protective resin is preferable. As the solvent, an organic solvent is usually used, and examples thereof may include a halogenated hydrocarbon solvent such as dichloromethane and chloroform; an aromatic solvent such as toluene and xylene; a ketone-based solvent such as methyl isobutyl ketone and cyclohexanone; an ether-based solvent such as diethyl ether and tetrahydrofuran; a hydrocarbon-based solvent such as n-pentane, n-hexane, n-heptane, cyclohexane, methylcyclohexane, and ethylcyclohexane; an alcohol-based solvent such as isopropanol and n-butanol; and an ester-based solvent such as ethyl acetate, isopropyl acetate, and butyl acetate.

When the production method including the solvent treatment is performed, a small amount of solvent usually remains in the protective film layer of the produced polarizing plate. Therefore, the protective resin forming the protective film layer may have a volatile component content larger than 0.03% by weight. However, even when the polarizing plate has such a protective film layer containing a protective resin having a volatile component content larger than 0.03% by weight, at least implementation of the polarizing plate produced by the production method described with reference to the third embodiment is in a scope of implementation of the present invention.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operations described below were performed under the conditions of normal temperature and normal pressure in the atmospheric air, unless otherwise specified.

[Evaluation Methods]

[Method for Measuring in-Plane Retardation of Protective Film Layer]

The in-plane retardation of a protective film layer was measured using a phase difference meter ("Mueller matrix polarimeter (Axo Scan)" manufactured by Opto Science, Inc.). The measurement was performed at a measuring wavelength of 590 nm.

[Thickness Measurement Method]

The thickness of a polarizing plate and the thickness of each layer included in the polarizing plate were measured in the following manner.

A polarizing plate was cut using a microtome, and the cross section of the polarizing plate was observed using a TEM. The thickness-direction size of the polarizing plate was measured at five positions, and the average of measured values was adopted as a thickness.

[Method for Measuring Volatile Component Content of Resin]

The volatile component content of a resin forming a protective film layer was measured by analysis using headspace-gas chromatography.

[Surface State Evaluation]

The arithmetic average roughness Ra of a surface (surface located on the opposite side from a polarizer) of a protective film layer was measured in accordance with JIS B 0601: 1994 using a surface roughness tester ("SJ400" manufactured by Mitutoyo Corporation). When the arithmetic average roughness Ra as the result of the measurement was less than 50 nm, the surface condition of the protective film layer was evaluated as "good". When the arithmetic average roughness Ra was 50 nm or more, the surface condition was evaluated as "poor".

[Heat Shock Test]

A test piece having a width of 100 mm and a length of 100 mm was cut out from a polarizing plate in such a manner that the width direction of the test piece coincided with the absorption axis direction of a polarizer. The test piece was bonded to the surface of a glass plate having a width of 120 mm and a length of 120 mm with a tackiness agent to obtain an evaluation sample. As the aforementioned tackiness agent, a product produced by a method described in Example 1 in International Publication No. 2016/072324 was used.

The evaluation sample was subjected to 200 cooling and heating cycles each of which involves cooling to −30° C. and heating to 80° C. Then, the evaluation sample and the polarizing plate were placed on a light source in a stacked manner, and observation as to whether or not light leakage due to cracking exists was performed. In this observation, the evaluation sample and the polarizing plate were disposed in such a manner that the absorption axis of the polarizer of the evaluation sample was perpendicular to the absorption axis of the polarizing plate stacked thereon. The heat shock resistance of the polarizing plate was evaluated as "good" when light leakage was not visually observed, and was evaluated as "poor" when light leakage was observed.

[Heat Moisture Resistance Test]

A test piece was cut out from a polarizing plate in the same manner as that in the heat shock test. The test piece was stored in a constant temperature constant humidity bath that was kept at a temperature of 60° C. and a humidity of 90% for 500 hours.

A liquid crystal display was prepared which had a backlight, a backlight-side polarizing plate, a liquid crystal cell, and a viewing-side polarizing plate in this order. The viewing-side polarizing plate was removed from the liquid crystal display, and instead, the stored test piece was bonded thereto. The display quality of the liquid crystal display was visually observed. Upon bonding of the test piece, disposition was made in such a manner that the absorption axis of the test piece was perpendicular to the absorption axis of the backlight-side polarizing plate of the liquid crystal display. The humidity and heat resistance of the polarizing plat was evaluated as "good" when images displayed on the liquid crystal display were sufficiently recognizable, and was evaluated as "poor" when the images were unrecognizable.

Production Example 1: Synthesis of Resin

A reaction vessel having a stirring device was prepared, and air in the reaction vessel was sufficiently replaced with nitrogen. Then, 270 parts of dehydrated cyclohexane and 0.59 part of n-dibutyl ether were placed in the reaction vessel. Further, a 15% n-butyllithium cyclohexane solution was added to the reaction vessel so that the amount of n-butyllithium was 0.63 part.

(First Stage of Polymerization)

25.0 parts of dehydrated styrene was continuously added to the reaction vessel over 60 minutes while all the contents in the reaction vessel were stirred at 60° C. to perform a polymerization reaction, and after the completion of the addition, all the contents were further kept stirred for 20 minutes (first stage of polymerization). The temperature was kept at 60° C. from the start of the first stage of polymerization to the end of the third stage of polymerization. The reaction liquid thus obtained was measured by gas chromatography, and the polymerization conversion rate at this point of time was 99.5%.

(Second Stage of Polymerization)

Then, a mixture of 30.0 parts of dehydrated styrene and 25.0 parts of isoprene was continuously added to the reaction liquid over 150 minutes, and after the completion of the addition, the reaction liquid was further kept stirred for 20 minutes (second stage of polymerization). The polymerization conversion rate at this point of time was 99.5%.

(Third Stage of Polymerization)

Then, 20.0 parts of dehydrated styrene was continuously added to the reaction liquid over 60 minutes, and after the completion of the addition, the reaction liquid was further kept stirred for 20 minutes (third stage of polymerization). The polymerization conversion rate at this point of time was almost 100%. At this point of time, 0.5 part of isopropyl alcohol was added to the reaction liquid to terminate the reaction. In this manner, a mixture containing a block copolymer was obtained. The block copolymer thus obtained had a weight-average molecular weight (Mw) of 68,100 and a molecular weight distribution (Mw/Mn) of 1.03.

(Hydrogenation)

The mixture containing the block copolymer obtained in the aforementioned procedure (third stage of polymerization) was transferred into a pressure-tight reaction vessel having a stirring device, and 7.0 parts of diatomite-supported nickel catalyst ("E22U" manufactured by JGC Catalysts and Chemicals Ltd., amount of nickel supported: 60%) as a hydrogenation catalyst and 80 parts of dehydrated cyclohexane were added to the pressure-tight reaction vessel and mixed with the mixture. Air in the reaction vessel was replaced with hydrogen gas, and hydrogen was further supplied while the solution was stirred to perform a hydrogenation reaction at a temperature of 190° C. and a pressure of 4.5 MPa for 6 hours.

After the completion of the hydrogenation reaction, the reaction solution was filtered to remove the hydrogenation catalyst. To the filtered liquid, 1.0 part of a xylene solution in which 0.1 part of pentaerythrityl-tetrakis [3-(3,5-di-t-butyl-4-hydroxyphenyl) propionate] ("Songnox1010" manufactured by KOYO Chemical Research Center) as a phenol-based antioxidant was dissolved was added and dissolved.

Then, the solvent cyclohexane and xylene as well as other volatile components were removed from the solution using a cylindrical concentration dryer ("Kontro" manufactured by Hitachi Ltd.) at a temperature of 260° C. and a pressure of 0.001 MPa or less to obtain a melted polymer. The melted polymer was continuously filtered through a polymer filter connected to the concentration dryer at a temperature of 260° C. As the polymer filter, a polymer filter having a stainless steel sintered filter having a pore size of 20 µm (manufactured by FUJI FILTER Manufacturing CO., LTD.) was used. After the completion of the filtration, the melted polymer was extruded through a die into a strand, cooled, and pelletized by a pelletizer to obtain 91 parts of pellets of a polymer X. The polymer X thus obtained had a weight-average molecular weight (Mw) of 71,400, a molecular weight distribution (Mw/Mn) of 1.06, and a hydrogenation ratio of almost 100%.

Example 1

(Production of Resin Film)

The polymer X obtained in Production Example 1 was supplied to a thermal melt extrusion film molding machine equipped with a T die. The polymer X was extruded through the T die and wound up around a roll at a winding speed of 4 m/min, to mold the polymer X in a form of a film. In this manner, a long-length resin film (thickness: 50 µm) formed of the polymer X was obtained.

(Step (A): Stretching of Resin Film)

The aforementioned resin film was stretched in a film lengthwise direction using a longitudinal uniaxial stretching machine at a stretching ratio of 1.5 times and a stretching temperature of 120° C. to obtain an oriented film.

(Step (B1): Bonding of Oriented Film and Polarizer)

The following operations were performed while a long-length polyvinyl alcohol film having a thickness of 30 µm was continuously conveyed in its lengthwise direction through guide rolls.

The aforementioned polyvinyl alcohol film was subjected to a dyeing treatment by immersing it in a dyeing solution containing iodine and potassium iodide. The film having been subjected to the dyeing treatment was subjected to a first stretching treatment by stretching it 2.5 times. Then, the stretched film was subjected to a second stretching treatment by stretching it in an acid bath containing boric acid and potassium iodide. The stretching ratio of the second stretching treatment was set so that the total stretching ratio expressed as the product of the stretching ratio of the first stretching treatment and the stretching ratio of the second stretching treatment was 6 times. Then, the stretched film was subjected to a cross-linking treatment to obtain an iodine-PVA-based polarizer. The polarizer thus obtained was dried in a dryer at 70° C. for 5 minutes.

100 parts of water, 3 parts of a polyvinyl alcohol-based adhesive ("Z-200" manufactured by The Nippon Synthetic Chemical Industry Co., Ltd.), and 0.3 part of a cross-linking agent ("SPM-01" manufactured by The Nippon Synthetic Chemical Industry Co., Ltd.) were mixed to obtain an adhesive composition. This adhesive composition was applied onto the oriented film, and the oriented film was bonded to one surface of the produced polarizer. In this state, the adhesive composition was dried by heating at 70° C. for 5 minutes. In this manner, an intermediate layered body was obtained which had a layer structure of oriented film/adhesive layer/polarizer.

(Step (C1): Peeling-Off of Oriented Film)

The oriented film was peeled off from the intermediate layered body obtained above in its lengthwise direction at a peel angle of 90° and a peel speed of 300 mm/min. At this time, a part of the oriented film (a surface layer part on the side that was close to the polarizer) remained unpeeled adhering to the adhesive layer. In this manner, a first protective film layer formed of the surface layer part of the oriented film was transferred onto the surface of the adhesive layer, so that a polarizing plate was obtained which had a layer structure of first protective film layer/adhesive layer/polarizer. In this product, the dry thickness of the adhesive layer was 0.07 μm, and the thickness of the first protective film layer was 0.04 μm.

(Step (B2): Bonding of Oriented Film and Polarizer)

The adhesive composition obtained above was applied onto the oriented film, and the oriented film was bonded to the other surface of the polarizer of the polarizing plate obtained above. In this state, the adhesive composition was dried by heating at 70° C. for 5 minutes. In this manner, an intermediate layered body was obtained which had a layer structure of first protective film/adhesive layer/polarizer/adhesive layer/oriented film.

(Step (C2): Peeling-Off of Oriented Film)

The oriented film was peeled off from the intermediate layered body obtained above along its lengthwise direction at a peel angle of 90° and a peel speed of 300 mm/min. At this time, a part of the oriented film (a surface layer part on the side that was close to the polarizer) remained unpeeled adhering to the adhesive layer. In this manner, a second protective film layer formed of the surface layer part of the oriented film was transferred onto the surface of the adhesive layer, so that a polarizing plate was obtained which had a layer structure of first protective film layer/adhesive layer/polarizer/adhesive layer/second protective film layer. In this product, the dry thickness of each of the adhesive layers was 0.07 μm, and the thickness of each of the protective film layers was 0.04 μm.

The obtained polarizing plate was evaluated by the above-described methods.

Example 2

The method of stretching a resin film in the aforementioned step (A) was changed as follows.

The resin film produced in the above-described step (Production of resin film) was stretched at a stretching temperature of 120° C. using a sequential biaxial stretching machine in a film lengthwise direction at a stretching ratio of 1.5 times and in a film width direction at a stretching ratio of 1.5 times to obtain an oriented film.

A polarizing plate was produced and evaluated by the same manner as that of Example 1 except for the above-described matter.

Example 3

In place of the polymer X obtained in Production Example 1, a norbornene-based polymer resin ("ZEONOR 1420" manufactured by ZEON Corporation, glass transition temperature: 136° C.) was used as the material for producing a resin film in the above-described step (Production of resin film).

Further, the stretching temperature and the stretching ratio of the resin film in the above-described step (step (A)) were changed to 140° C. and 2.0 times, respectively.

A polarizing plate was produced and evaluated by the same manner as that of Example 1 except for the above-described matters.

Example 4

Before the adhesive composition was applied onto the oriented film, the oriented film was subjected to a solvent treatment by applying cyclohexane in an atmosphere at 23° C. onto the surface of the oriented film onto which the adhesive composition was to be applied, and then drying the cyclohexane at 100° C. after 3 seconds from the completion of the application.

A polarizing plate was produced and evaluated by the same manner as that of Example 3 except for the above-described matter.

Comparative Example 1

A polarizing plate was produced by a manner that is approximately the same as that of Example 1 in Japanese Patent Application Laid-Open No. 2011-128486 A. Specifically, the polarizing plate was produced in the following manner.

As a coating-subject substrate, a 110 μm-thick unstretched random polypropylene (PP) film was prepared. The surface of the coating-subject substrate was subjected to corona treatment.

A polyvinyl alcohol powder ("Z-200" manufactured by The Nippon Synthetic Chemical Industry Co., Ltd, average polymerization degree: 1100, average saponification degree: 99.5 mol %) was dissolved in hot water at 95° C. to prepare an aqueous solution having a concentration of 3% by weight. Then, a cross-linking agent ("Sumirez (registered trademark) Resin 650" manufactured by Sumitomo Chemical Company, Limited) was mixed with the obtained aqueous solution in an amount of 5 parts by weight per 6 parts by weight of the polyvinyl alcohol powder. The mixed aqueous solution thus obtained was applied onto the coating-subject substrate having been subjected to corona treatment, and then dried at 80° C. for 10 minutes to form a first resin layer having a thickness of 0.2 μm.

A polyvinyl alcohol powder (manufactured by Kuraray Co., Ltd., average polymerization degree: 2400, average saponification degree: 98 mol % to 99 mol %) was dissolved in hot water at 95° C. to prepare an aqueous polyvinyl alcohol solution having a concentration of 8% by weight. The obtained aqueous solution was applied onto the aforementioned first resin layer and dried at 80° C. for 20 minutes to produce a layered film having a three-layer structure of coating-subject substrate/first resin layer/second resin layer. At this point of time, the second resin layer had a thickness of 15 μm.

The aforementioned layered film was subjected to free-end uniaxial stretching in a film lengthwise direction at a stretching temperature of 126° C. and a stretching ratio of 6.0 times using a tenter apparatus to obtain a stretched film. Then, the stretched film was immersed in a hot bath at 60° C. for 60 seconds and immersed in a mixed aqueous solution of iodine and potassium iodide at 30° C. for 180 seconds, and then the excess iodine solution was washed away with pure water at 10° C. Then, this stretched film was immersed in a mixed aqueous solution of boric acid and potassium iodide at 76° C. for 300 seconds. Then, the stretched film was washed with pure water at 10° C. for 4 seconds and dried at 50° C. for 300 seconds to form a polarizer on the coating-subject substrate. At this point of time, the polarizer had a thickness of 7 μm.

Then, a polyvinyl alcohol-based adhesive was applied onto the surface of the polarizer opposite to the surface on which the coating-subject substrate was provided, and then a triacetyl cellulose film (thickness: 25 μm) was bonded as a protective film. Then, the coating-subject substrate was peeled off to obtain a polarizing plate having a layer structure of protective film/adhesive layer/polarizer.

The polarizing plate thus obtained was evaluated by the above-described methods.

Comparative Example 2

Before the adhesive composition was applied onto the oriented film, the oriented film was subjected to solvent treatment by applying cyclohexane in an atmosphere at 23° C. onto the surface of the oriented film onto which the adhesive composition was to be applied, and then drying the cyclohexane at 100° C. after 3 seconds from the completion of the application.

A polarizing plate was produced and evaluated by the same manner as that of Example 1 except for the above-described matter.

Comparative Example 3

A polarizing plate was produced by a manner that is approximately the same as that of Example 1 in Japanese Patent Application Laid-Open No. 2011-128486 A, and then a protective layer was formed using a UV-curable resin described in the paragraph [0133] in Japanese Patent Application Laid-Open No. 2015-161782 A. Specifically, the polarizing plate was produced in the following manner.

A polarizing plate having a layer structure of protective film/adhesive layer/polarizer was produced by the same manner as that of Comparative Example 1. The surface on the side of the polarizer of the polarizing plate was subjected to corona treatment. Then, a UV-curable resin (a resin containing a cationic polymerizable epoxy-based compound as a curable compound and a photo cationic polymerization initiator; "KR-25T" manufactured by ADEKA Corporation) was applied onto the corona-treated surface with the use of a microgravure coater. Then, irradiation with UV rays onto the side of the applied resin layer was performed at an accumulated irradiance of 200 mJ/cm$^2$ with the use of a high-pressure mercury lamp, to thereby cure the layer. In this manner, a polarizing plate was obtained which had a layer structure of protective film/adhesive layer/polarizer/protective layer. The protective layer had a thickness of 10.5 μm.

The obtained polarizing plate was evaluated by the above-described methods.

[Results]

The results of Examples and Comparative Examples are shown in the following table.

In the following table, the evaluation result of surface state of Comparative Example 1 is the result of evaluation of the surface of the polarizer (surface exposed by peeling off the coating-subject substrate).

In the following table, the evaluation result of surface state of Comparative Example 3 is the result of evaluation of the surface of the protective layer formed of the UV-curable resin.

The meanings of abbreviations in the following table are as follows.
HSIS: polymer X
COP: norbornene-based polymer resin
TAC: triacetyl cellulose
PVA: polyvinyl alcohol
Re: in-plane retardation
UV resin: UV-curable resin

TABLE 1

Results of Examples and Comparative Examples

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| First protective film layer | | | | | | | |
| Material | HSIS | HSIS | COP | COP | TAC | HSIS | TAC |
| Thickness [μm] | 0.04 | 0.04 | 0.03 | 0.30 | 25 | 0.60 | 25 |
| Volatile component content (wt %) | 0.01 | 0.01 | 0.01 | 0.03 | 0.2 | 0.03 | 0.2 |
| Re [nm] | 0 | 0 | 0 | 1 | 0 | 0 | 0 |
| Polarizer | | | | | | | |
| Material | PVA | PVA | PVA | PVA | PVA | PVA | PVA |
| Thickness [μm] | 12 | 12 | 12 | 12 | 7 | 12 | 7 |
| Second protective film layer | | | | | | | |
| Material | HSIS | HSIS | COP | COP | — | HSIS | UV resin |
| Thickness [μm] | 0.04 | 0.04 | 0.03 | 0.30 | — | 0.60 | 10.5 |
| Volatile component content (wt %) | 0.01 | 0.01 | 0.01 | 0.03 | — | 0.03 | 0.2 |
| Re [nm] | 0 | 0 | 0 | 1 | 0 | 0 | 0 |
| Surface state | Good | Good | Good | Good | Poor | Good | Good |
| Heat shock | Good | Good | Good | Good | Poor | Poor | Good |
| Heat moisture test | Good | Good | Good | Good | Poor | Good | Poor |

REFERENCE SIGN LIST 10 polarizing plate
20 polarizing plate
30 intermediate layered body
110 polarizer
120 protective film layer
230 protective film layer
300 oriented film
310 a part of oriented film

The invention claimed is:

1. A polarizing plate comprising a polarizer, and a protective film layer formed on at least one surface of the polarizer, wherein:
the protective film layer is formed of a protective resin having a volatile component content of 0.03% by weight or less,
the protective film layer is a surface part of a single-layer resin film that has not been peeled off an intermediate layered body formed with the polarizer, after the single-layer resin film is peeled to cause delamination in the inner part of the thickness direction of the single-layer resin film, the single-layer resin film having been molded by a melt extrusion method and then subjected to a stretching treatment including stretching at a stretching ratio of 1.1 times or more, the protective resin is at least one resin selected from the group consisting of a cyclic olefin resin, and a polymer resin having a hydrogenated product unit of a cyclic hydrocarbon group-containing compound and a hydrogenated product unit of a chain hydrocarbon compound, the protective resin contains an oriented polymer, and a thickness d of the protective film layer satisfies the formula (1):

$$0.01\ \mu m \leq d \leq 0.5\ \mu m \tag{1}$$

2. The polarizing plate according to claim 1, wherein a thickness of the polarizer is 15 μm or less.

3. The polarizing plate according to claim 1, comprising an adhesive layer formed of a tackiness agent or a hot-melt material as an outermost layer of the polarizing plate.

4. The polarizing plate according to claim 1, wherein the polarizer is formed of a polyvinyl alcohol-based resin.

5. A polarizing plate comprising a polarizer, a first protective film layer formed on a first surface of the polarizer, and a second protective film layer formed on a second surface of the polarizer, wherein:

the first and second protective film layers are formed of a protective resin having a volatile component content of 0.03% by weight or less, each of the first and second protective film layers is a surface layer part of a single-layer resin film that has not been peeled off an intermediate layered body formed with the polarizer, after the single-layer resin film is peeled to cause delamination in the inner part of the thickness direction of the single-layer resin film, the single-layer resin film having been molded by a melt extrusion method and then subjected to a stretching treatment including stretching at a stretching ratio of 1.1 times or more, the protective resin is at least one resin selected from the group consisting of a cyclic olefin resin, and a polymer resin having a hydrogenated product unit of a cyclic hydrocarbon group-containing compound and a hydrogenated product unit of a chain hydrocarbon compound, the protective resin contains an oriented polymer, and a thickness $d_1$ of the first protective film layer and a thickness $d_2$ of the second protective film layer, are each 0.5 μm or less, and satisfy the formula (2):

$$0.02\ \mu m \leq d_1 + d_2 \leq 1.0\ \mu m \tag{2}$$

6. The polarizing plate according to claim 5, wherein a thickness of the polarizer is 15 μm or less.

7. The polarizing plate according to claim 5, comprising an adhesive layer formed of a tackiness agent or a hot-melt material as an outermost layer of the polarizing plate.

8. The polarizing plate according to claim 5, wherein the polarizer is formed of a polyvinyl alcohol-based resin.

9. A method for producing a polarizing plate comprising:

a step (A) of molding a resin film by a melt extrusion method, and then subjecting the resin film to a stretching treatment, the treatment including stretching at a stretching ratio of 1.1 times or more;

a step (B) of bonding the resin film having been subjected to the stretching treatment in the step (A) and a polarizer together to obtain an intermediate layered body; and a step (C) of peeling off a part of the resin film of the intermediate layered body to cause delamination in the inner part of the thickness direction of the resin film, to thereby provide, on the polarizer, a protective film layer formed of a surface layer part of the resin film that has not been peeled off and having a thickness d that satisfies the formula (1):

$$0.01\ \mu m \leq d \leq 0.5\ \mu m \tag{1},$$

wherein the resin film is a single-layer resin film formed of a resin having a volatile component content of 0.03% by weight or less, and the resin is at least one resin selected from the group consisting of a cyclic olefin resin, and a polymer resin having a hydrogenated product unit of a cyclic hydrocarbon group-containing compound and a hydrogenated product unit of a chain hydrocarbon compound.

* * * * *